United States Patent [19]

Bias

[11] 4,060,925
[45] Dec. 6, 1977

[54] FISHING BOBBER AND BAIT GUARD

[75] Inventor: Arnett Bias, Cuyahoga Falls, Ohio

[73] Assignee: Bait Guard Inc., Cuyahoga Falls, Ohio

[21] Appl. No.: 703,523

[22] Filed: July 8, 1976

[51] Int. Cl.² ............................................. A01K 97/04
[52] U.S. Cl. ................................... 43/41.2; 43/42.35
[58] Field of Search ........................ 43/41.2, 41, 42.35

[56] References Cited

U.S. PATENT DOCUMENTS

| | | | |
|---|---|---|---|
| 2,629,198 | 2/1953 | Johnston | 43/41.2 |
| 2,910,798 | 11/1959 | Bias | 43/41.2 |
| 3,200,531 | 8/1965 | Colbert | 43/41.2 |
| 3,309,811 | 3/1967 | Wimer | 43/42.35 X |
| 3,686,787 | 8/1972 | Milovich | 43/41.2 X |
| 3,705,465 | 12/1972 | Charney | 43/42.35 X |

*Primary Examiner*—Louis G. Mancene
*Assistant Examiner*—Daniel J. Leach
*Attorney, Agent, or Firm*—Frederick K. Lacher

[57] ABSTRACT

A fishing bobber and bait guard assembly including a lightweight, hollow, generally cylindrical float with a rounded nose and a disc closure plate. The bait guard portion is generally cylindrical with one end removably mounted on the disc closure and the other end open for insertion of the bait. The disc closure may have lugs disposed for locking engagement with a radially inner flange on the forward end of the bait guard. The bait guard is of a resilient material for compression between the lugs and a surface of the disc closure. The resilience also serves to withstand impacts and deformation in use without damage to the guard. Counterweighted portions of the float and guard maintain the unit in balance during casting. The float has a diameter and length suitable for nesting in the bait guard portion so that the assembly may be stored in a minimum of space in a tackle box.

6 Claims, 7 Drawing Figures

U.S. Patent    Dec. 6, 1977    4,060,925
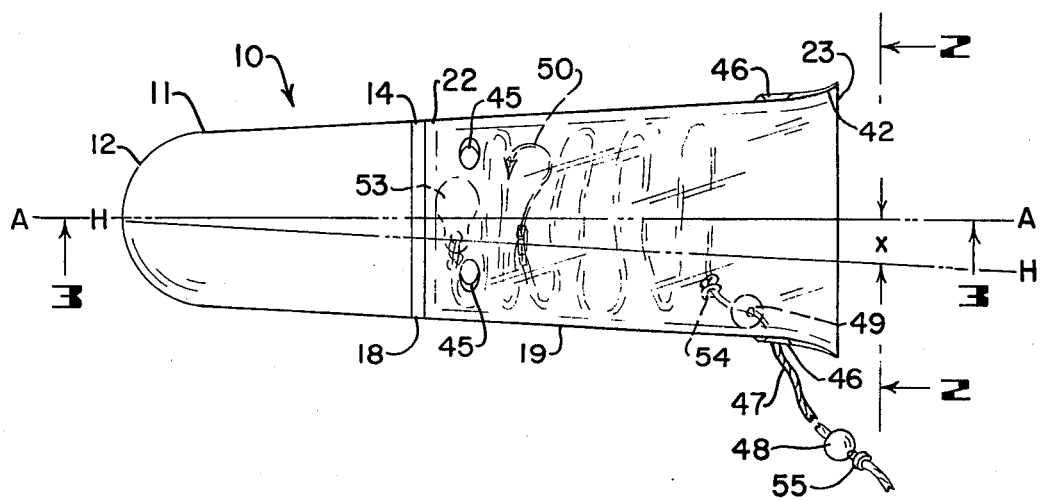
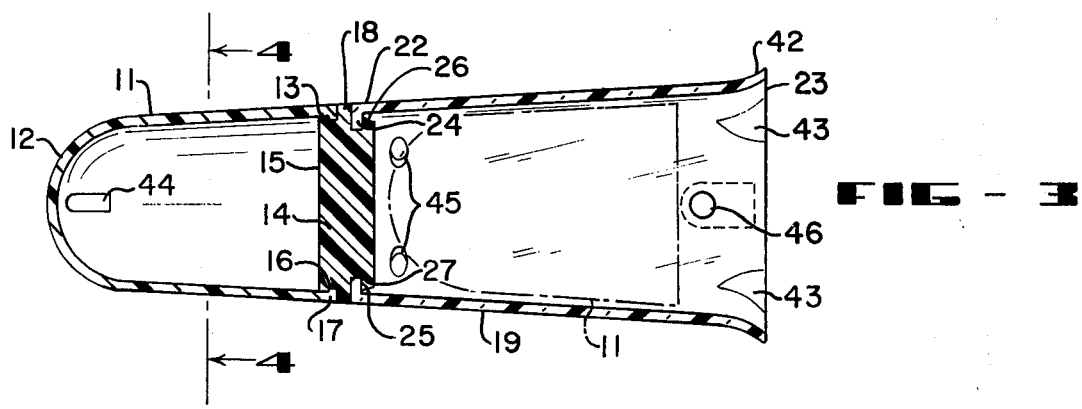
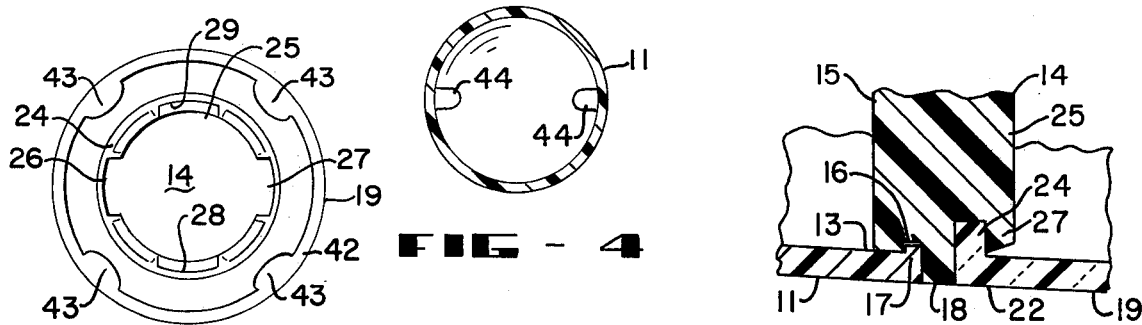
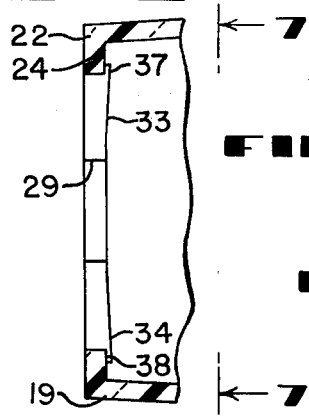
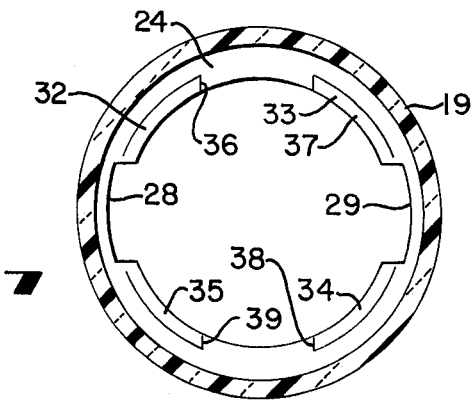

FISHING BOBBER AND BAIT GUARD

BACKGROUND OF THE INVENTION

This invention relates to fishing tackle and especially to fishing bobbers which include a bait guard for protecting the bait during casting.

Fishing bobbers with bait guards which have been proposed heretofore have had a floating bobber with a bait cup attached to the bobber in which the baited hook and sinker is placed so that the bait may be protected during the cast and also from impact when it hits the water. An example of such a bobber with a bait guard is shown and described in U.S. Pat. No. 2,910,798 of Thomas W. Bias, dated Nov. 3, 1959. This construction was relatively expensive to manufacture because the float portion had to be shaped from a solid piece of buoyant material such as wood and the threaded connection between the cup and float portion required special machining of the cup base. Also the screw on the float had to be fabricated and then fastened to the float. This connection could be shaken loose in operation and the threaded stud was subject to corrosion due to the action of the water which could prevent removal of the cup after the assembly had been resting in a tackle box for a period of time.

Fishermen also want tackle which is lightweight and weighs not over 2 or 3 ounces including the bait and sinker carried in the bait guard. Meeting these weight specifications was difficult with the construction of this patent. With a solid float it was also difficult to provide a bobber which would ride high in the water and would not become waterlogged through use. The flight characteristics of the assembly during the casting were not balanced because of the great weight of the bobber as compared with the weight of the cup. Also, the space within the cup was limited because the base must be of a thick construction to provide the necessary bushing with female threads for the threaded connection with the screw on the bobber. This thick base also adds to the weight of the unit which is not desirable. The space within the cup is needed for the line, sinker and bait.

In other bait guards including floats, the length has been too long for economical molding of plastic. Making them out of other material such as metal has increased the weight and cost beyond that accepted by the average fisherman. Also it has been difficult to store the bait guards because they took up so much room in a tackle box.

SUMMARY OF THE INVENTION

The present invention provides an economical lightweight balanced fishing bobber and bait guard assembly which can be economically molded in component parts and easily assembled. The hollow float portion has a rounded nose and generally cylindrical wall which may be molded separately of a colored material. A disc closure plate for closing the open end of the bobber may also be molded of a colored material. The disc closure plate not only serves to close the end of the bobber but also reinforces the bobber and provides a snap lock for gripping the end of the bait guard.

The bait guard which is a lightweight, generally cylindrical tube may also be molded of a transparent or colorless material so that the whole assembly is lightweight. The bobber may be molded of colored rigid polyvinyl chloride and the tubular guard of resilient clear polyethylene to provide the necessary rigidity of the bobber and resilience of the guard.

The snap lock engages a thin flange of the tubular guard and thereby the maximum space for the bait, line and sinker are provided within the guard. With this construction the weight of the guard is minimized. The guard with the line, bait, hook and sinker contained therein provides a weight distribution of the bobber and bait guard such that desirable flight characteristics are obtained. Additional weight is added at the nose of the float portion and at the trailing edge of the tubular guard to further provide the necessary balance and flight characteristics.

The greater resilience of the material of the guard as compared to the resilience of the material of the disc closure plate is utilized in the operation of the snap lock in that locking lugs on the plate engage ribs on the flange of the guard and these ribs are deflected by engagement of the lugs as they are moved to a locking position after which the ribs resiliently snap back to hold the lugs in the locked position. The resiliency of the guard also prolongs the life of the unit since this material can withstand deformation in use and during storage without cracking or breaking. The length of the molded parts may be held to a minimum which is necessary to reduce the cost of the molds and molding equipment for economically manufacturing these parts. For storage in a tackle box the bobber and guard may be disassembled and the bobber nested in the guard to take up a minimum of space.

BRIEF DESCRIPTION OF THE DRAWINGS

FIG. 1 is an elevation of the fishing bobber and bait guard construction showing the relative position in which it moves through the air during casting.

FIG. 2 is an end view taken along the plane of line 2—2 in FIG. 1.

FIG. 3 is a sectional view taken along the plane of line 3—3 of FIG. 1. Also the storage position of the bobber in the guard is shown in chain-dotted lines.

FIG. 4 is a cross sectional view taken along the plane of line 4—4 of FIG. 3.

FIG. 5 is an enlarged fragmentary sectional view like FIG. 3 showing the joint between the disc closure plate and wall edge of the float portion.

FIG. 6 is an enlarged fragmentary view like FIG. 3 of the end of the bait guard tube showing the locking ribs.

FIG. 7 is a sectional view taken along the plane of line 7—7 in FIG. 6.

DETAILED DESCRIPTION

Referring to the drawings a fishing bobber and bait guard assembly 10 is shown in use in FIG. 1 and in section in FIG. 3. The assembly 10 includes a hollow, generally cylindrical, float portion 11 which may be molded of a suitable plastic such as colored rigid polyvinyl chloride. The float portion 11 has a rounded nose 12 at one end and a generally cylindrical opening 13 at the other end for receiving a disc closure plate 14 which may also be molded of a rigid polyvinyl chloride.

The closure plate 14 has an inset portion 15 with an outer diameter substantially the same as the inner diameter of the float portion 11 at the cylindrical opening 13. A circumferential groove 16 may be provided in the radially outer surface of the inset portion 15 for receiving a circumferentially extending rib 17 extending radially inward from the edge of the float portion 11 at the cylindrical opening 13. Upon insertion of the inset portion 15 of the disc closure plate 14 into the cylindrical opening 13 the rib 17 engages the groove 16 for holding the plate in position on the float portion 11. Preferably an adhesive is also provided between the contacting surfaces of the float portion 11 and closure plate 14 to hermetically seal the space within the float portion.

A radially extending flange 18 on the closure plate 14 is positioned to overlap the edge of the float portion 11 and has a diameter substantially the same as the diameter of the float portion. The flange 18 may also be adhered to the edge of the float portion 11 by a suitable adhesive.

Removably mounted on the float portion 11 is a bait guard or bait container portion 19 which is in the form of a generally cylindrical body open at both ends and may be molded of a suitable, resilient substantially colorless plastic material such as polyethylene. The container portion 19 has a mounting end 22 which is removably connected to the float portion 11 and an open end 23 for insertion of the hook, line, bait and sinker. The mounting end 22 of the container portion 19 has a locking flange 24 extending radially inward from the edge of the container portion. The closure plate 14 includes an axially extending locking portion 25 with locking lugs 26 and 27 spaced from flange 18 and extending radially outward for gripping the locking flange 24 of the container portion 19. Slots 28 and 29 are provided in the locking flange 24 through which the locking lugs 26 and 27 may be inserted and rotated relative to the flange.

As shown in FIGS. 6 and 7 sloped circumferentially extending ribs 32, 33, 34 and 35 are positioned on the locking flange 24 for sliding engagement with the locking lugs 26 and 27 of the closure plate 14. These ribs 32 through 35 are sloped from the slots 28 and 29 to the locked position shown in FIG. 2 and have locking edges 36, 37, 38 and 39 for holding the lugs 26 and 27 in the locked position. The ribs 32 through 35 and locking flange 24 of the container portion 19 are molded of the same resilient plastic material as the container portion and accordingly may be compressed between the locking lugs 26 and 27 and the flange 18 of the closure plate 14 during rotation of the container portion relative to the float portion 11 to provide a locked-in connection of the float portion with bait container portion. The resilience of the material of the container portion 19 also provides a resistance to impact the deformation in use.

At the open end 23 of the container portion 19 a trailing edge 42 is flared radially outwardly to provide improved flight characteristics of the assembly 10 during casting. At the trailing edge 42 counterweight portions such as projections 43 extend radially inward from the surface of the container portion 19 at circumferentially spaced-apart positions around the trailing edge to reinforce the trailing edge and provide increased wall thickness to balance the bobber and bait guard assembly 10 for flight through the air during casting.

Counterweights such as pins 44 projecting from the inner wall of the nose 12 of the float portion 11 provide the desired flight characteristics. The pins 44 also are useful in ejecting the float portion 11 from a mold.

In molding the float portion 11 and bait container portion 19 the weight of the float portion is maintained at approximately ½ ounce and the weight of the container portion is maintained at approximately ¼ ounce. The normal weight of the bait is ¼ ounce and the weight of the sinker is ¼ ounce providing a total weight of the assembly 10 as cast of approximately 1¼ ounces.

Vents 45 are located near the mounting end 22 of the container portion 19 at circumferentially spaced-apart positions around the container portion so that there will be a rapid displacement of air from the container portion upon entry into the water to provide a quick sinking of the container portion and upending of the bobber and bait guard assembly 10 in the water. The vents 45 also make it easier to pull the bobber and bait guard assembly 10 through the water when a fish has been caught.

Apertures 46 are located in the wall of the container portion 19 near the trailing edge 42 for passage of a fishing line 47 through the wall into the space within the container portion.

The bobber and bait guard assembly 10 is shown in the assembled condition in the drawings; however, when the float portion 11 and container portion 19 are stored in a tackle box the float portion may be nested within the container portion as shown in chain-dotted lines in FIG. 3. This is possible because the length and diameter of the float portion 11 is less than the length and inner diameter of the container portion 19.

In use of the bobber and bait guard assembly 10, a limit bead 48 having a passage only slightly larger than the fishing line 47 is threaded on the line which is then passed through the aperture 46 from the outside of the container portion 19 to the inside. A stop bead 49 having a passage similar to that of the limit bead 48 is then threaded on the line and the leader of hook 50 and sinker 53 are attached to the line by tying a knot 54 in a well-known manner. The knot 54 will not pass through the passage in the stop bead 49 and the stop bead will not pass through the aperture 46 and therefore prevents drawing of the hook, leader and sinker line through the aperture.

In use with a fishing pole the bobber and bait guard assembly 10 is drawn up to the end of the pole with the sinker 53 and bait on the hook 50 disposed within the container portion 19 as shown in FIG. 1. When the bobber and bait guard assembly 10 is cast it turns as it is cast with the float portion 11 being forwardmost during the entire flight. Also the bobber and bait guard assembly 10 is maintained at a tilted condition with the nose 12 inclined downwardly so that the axis A—A of the assembly is at an angle X of around 10° to the horizontal indicated by the line H—H as shown in FIG. 1. This angle X serves to retain the hook 50, sinker 53 and bait in the container portion 19 during flight.

When the assembly 10 hits the water the weight of the sinker 53 will cause it to tilt downward and water which may first flow into the container portion 19 through the apertures 46 will displace the air which escapes through the vents 45. The baited hook 50 and sinker 53 will drop by gravity from the container portion 19. A rubber band 55 may be releasably tied to the fishing line 47 on the pole side of the limit bed 48 to limit the depth to which the bait will sink. The knot formed by tying the rubber band 55 on the fishing line 47 will not pass through the passage of the limit bead 48 and the limit bead is of such size that it will not pass through the aperture 46 in the wall of the container portion 19. The bait on the hook 50 and the sinker 53 will therefore be suspended from a point near the trailing edge 42 of the container portion 19 and the assembly 10 will float with the float portion 11 in the uppermost position to serve as a bobber. The container portion 19 of a clear or colorless material will not frighten the fish and the float portion 11 being of a colored material can be easily seen so that when a strike occurs it will be signaled to the fisherman by the action of this float portion.

The bobber and bait guard assembly 10 of this invention may be used with a fishing pole; however, it may also be used on a line which is hand cast. Not only does the two-piece detachable construction provide for nesting and storage in a relatively small space in a tackle box but also the molding of the unit can be done on a relatively small press because the length of the float portion 11 and container portion 19 are substantially less than the length of the complete assembly. This results in a unit which can be economically manufactured. Furthermore, in the event that either the float portion 11 or the container portion 19 is damaged only the damaged part need be replaced and replacement of the complete unit is not required.

While a certain representative embodiment and details have been shown for the purpose of illustrating the invention it will be apparent to those skilled in the art that various changes and modifications may be made therein without departing from the spirit and scope of the invention.

I, therefore, particularly point out and distinctly claim as my invention:

1. A fishing bobber and bait guard assembly comprising a hollow, generally cylindrical, float portion having a rounded nose and a disc closure plate, a bait container portion having a generally cylindrical wall open at both ends, said wall at a first one of said ends being mounted on said closure plate, a second one of said ends being open for insertion of the bait, said closure plate having locking lugs spaced from a surface of said plate and said container portion having a locking flange extending radially inward from said wall at said first one of said ends for positioning between said locking lugs and said surface of said plate in locking relationship.

2. A fishing bobber and bait guard assembly according to claim 1 wherein said bait container portion is of a resilient material accommodating compression of said locking flange between said locking lugs and said surface of said plate and providing a flexibility of said bait container portion for withstanding impacts and deformation in use.

3. A fishing bobber and bait guard assembly according to claim 2 wherein said locking lugs extend radially outward at opposite sides of said closure plate and said locking flange has slots for insertion of said locking lugs, said locking flange having spaced-apart ribs between said slots and said locking lugs being rotatable relative to said locking flange for engagement with said surface of said flange to a position between said spaced-apart ribs for locking of said lugs in said position.

4. A fishing bobber and bait guard assembly comprising a hollow, generally cylindrical, float portion having a rounded nose and a disc closure plate, a bait container portion having a generally cylindrical wall open at both ends, said wall at a first one of said ends being mounted on said closure plate, a second one of said ends being open for insertion of the bait, and said float portion having a counterweight in said rounded nose for balancing the bobber and bait guard during casting.

5. A fishing bobber and bait guard assembly according to claim 4 wherein said counterweight portion in said nose includes pins in said rounded nose extending in a generally axial direction of said float portion for increasing the weight of said nose and also facilitating ejection of said float portion from a mold.

6. A fishing bobber and bait guard assembly comprising a hollow, generally cylindrical, float portion having a rounded nose and a disc closure plate, a bait container portion having a generally cylindrical wall open at both ends, said wall at a first one of said ends being mounted on said closure plate, a second one of said ends being open for insertion of the bait, and the outer diameter of said float portion being less than the inner diameter of said container portion whereby said float portion may be stored inside said container portion to minimize storage space.

* * * * *